J. A. JOHNSON.
DRIVING AND SUPPORTING WHEEL OF HARVESTERS.

No. 259,398. Patented June 13, 1882.

Witnesses:
W. B. Masson
C. C. Shepherd

Inventor
John A. Johnson
by E. E. Masson
atty.

UNITED STATES PATENT OFFICE.

JOHN A. JOHNSON, OF MADISON, WISCONSIN, ASSIGNOR TO WALTER A. WOOD MOWING AND REAPING MACHINE COMPANY, OF HOOSICK FALLS, N. Y.

DRIVING AND SUPPORTING WHEEL OF HARVESTERS.

SPECIFICATION forming part of Letters Patent No. 259,398, dated June 13, 1882.

Application filed July 14, 1879.

*To all whom it may concern:*

Be it known that I, JOHN A. JOHNSON, of Madison, in the county of Dane and State of Wisconsin, have invented certain new and useful Improvements in Driving and Supporting Wheels of Harvesters; and I hereby declare that the following is a full, clear, and exact description of the same, reference being had to the accompanying drawings, making a part of this specification, in which—

Figure 1:
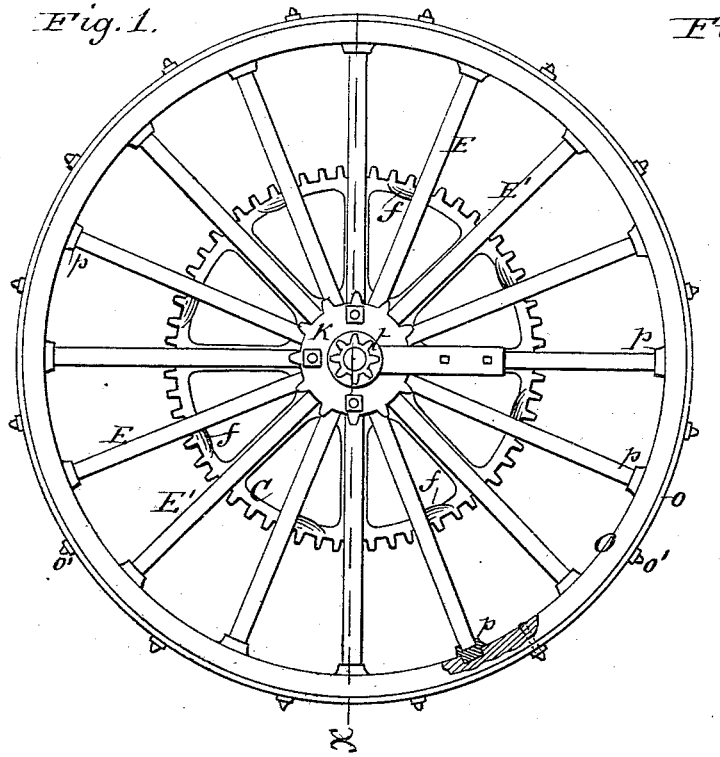
Figure 2:
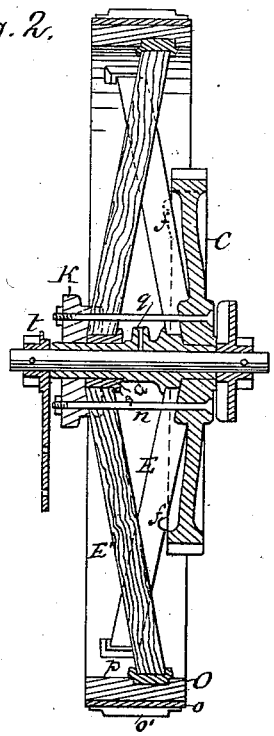
Figure 3:
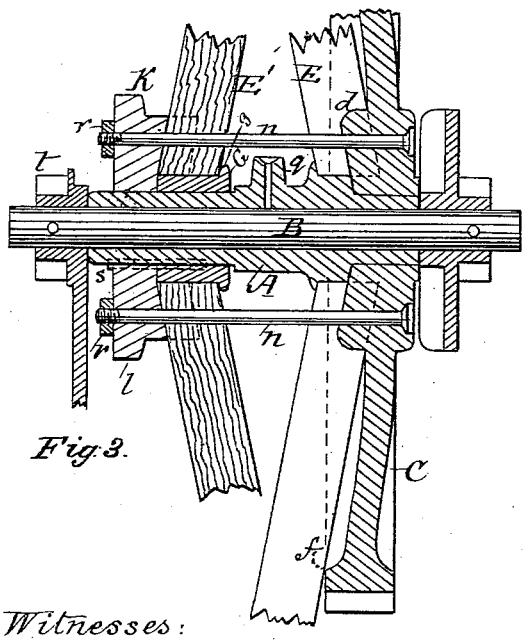
Figure 4:
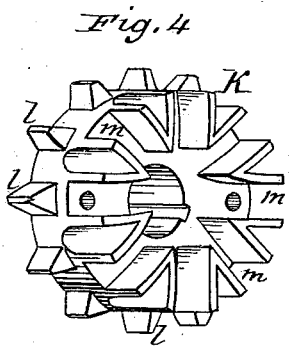
Figure 5:
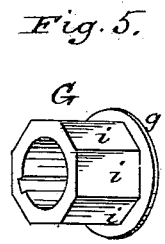

Figure 1 is a side elevation of my improved wheel. Fig. 2 is a diametric section of the same on line *x x* in Fig. 1. Fig. 3 is a similar view of the central portion of the wheel. Fig. 4 is a perspective view of a sprocket-wheel which forms a portion of the wheel-hub; and Fig. 5 is a similar view of a sleeve, the periphery of which forms seats for one of the series of spokes.

This invention relates to an improvement in the driving and supporting wheels of harvesting-machines; and its object is to simplify the construction and increase the compactness and strength of such wheels.

It consists essentially in forming and applying as integral portions of a harvester-supporting wheel those gear-wheels and transmitters of motion which have generally hitherto been simply attached to said wheels.

The construction and arrangement of the several parts composing the wheel according to my invention will be hereinafter particularly described with reference to the accompanying drawings.

The letter A designates a tubular central portion of the wheel-hub, forming the skein or thimble which fits upon the axle B. Upon one end of this central tube is keyed a gear-wheel, C, the function of which is to transmit motion from the supporting-wheel, through suitable intermediate mechanism, to the cutters of a harvester or mower. In one side of the hub of this wheel are formed sockets *d*, which receive the inner ends of one of the series E of staggered spokes E E' with which the wheel is provided. The rim of the wheel C has cast upon its side abutments *f*, which bear against the spokes and prevent undue torsional strain of said wheel upon the central portion, A, and the inner ends of the spokes. Upon the end of the tube A opposite to that upon which is located the gear-wheel C there is keyed the sleeve G, having a flange, *g*. The outer periphery of this sleeve is formed with flat faces *i*, which serve as seats for the inner end of the series of spokes E'. Upon the same end of the tube A, and projecting partially over the sleeve G, is keyed a wheel, K, provided with sprockets *l*, and having formed in one of its sides sockets *m*, which embrace the inner ends of the series of spokes E'. The function of the sprocket-wheel K is to transmit motion through a suitable chain to the reel or any other device, as desired. The wheels C and K are connected by bolts *n*, which pass through the inner ends of the spokes E' and between the spokes E; and said wheels, as will be observed, in addition to their function as transmitters of motion, form portions of the hub of the supporting-wheel. The function of the sleeve G is to facilitate the tightening of the spokes and bracing the several parts when they are assembled, as will be presently explained.

The letter O designates the rim or felly of the wheel, which is formed of wood, and is provided with a metallic tire, *o*, retained in position by transverse ribs *o'*, riveted or bolted to the felly. On the inner surface of said rim or felly O are arranged a series of cup-like sockets, *p*, which receive the outer ends of the spokes, and are retained in position by tenons inserted in the felly. These sockets are arranged in a staggered row, so that alternate spokes extend to near opposite edges of the felly, and so that the wheel may have quite a broad tread and at the same time have a well-braced rim.

The tube A is provided near its middle with an oil-passage, *q*, for the purpose of lubricating.

The axle B may of course have fixed upon it the usual lever-wheel, *t*, and the gears *u* for engaging with racks on the machine to raise or lower the latter.

In assembling the elements of my wheel I first key the gear-wheel C in position upon the tube A and insert the inner ends of the series of spokes E in the sockets of said wheel and in their proper cup-like sockets of the felly. I then place the sleeve G upon its end of tube A, seat the inner ends of the series of spokes E' upon the flat faces $i$ of said sleeve, and insert the outer ends of said spokes in their felly-sockets. The sprocket-wheel K is then passed over the end of tube A and its sockets $m$ caused to embrace the inner ends of the spokes E'. These parts being thus in position, the bolts $n$ are passed through holes in the wheel C, spokes E', and wheel K, and when the nuts $r$ have been placed upon the projecting screw-threaded ends of the bolts I gradually screw up these nuts until I find the parts all snugly adjusted in place, the key $s$ having been inserted in grooves provided for it, said key serving to hold both sleeve G and wheel K. The sleeve G moves smoothly upon the tube A, and thus permits the spokes to be drawn together much more easily and uniformly than if the inner ends of the series E' were required to slide directly upon the tube A. Should the spokes become loose by shrinkage, they may be readily tightened by screwing up the nuts $r$, the drawing together of their inner ends producing a similar effect on the two series of spokes.

Having now fully described my invention, I claim—

1. The combination of the wheel, wooden rim, staggered metallic cup-like spoke-sockets secured thereto, staggered spokes, gear-wheel C, and projections $f$ upon its rim to bear against the spokes, with central tube, A, and sprocket-wheel K, substantially as and for the purpose described.

2. The combination of the wheel, wooden rim, staggered metallic cup-like spoke-sockets secured thereto, staggered spokes, gear-wheel C, and projections $f$ upon its rim to bear against the spokes, with central tube, A, its polygonal sleeve G, and sprocket-wheel K, substantially as and for the purpose described.

JOHN A. JOHNSON.

Witnesses:
T. E. THOMPSON,
A. E. PROUDFIT.